(12) United States Patent  
Weingarten et al.

(10) Patent No.: US 8,667,211 B2
(45) Date of Patent: Mar. 4, 2014

(54) SYSTEM AND METHOD FOR MANAGING A NON-VOLATILE MEMORY (75) Inventors: Hanan Weingarten, Herzelia (IL); Michael Katz, Haifa (IL)

(73) Assignee: DensBits Technologies Ltd., Haifa (IL)

( * ) Notice: Subject to any disclaimer, the term of this patent is extended or adjusted under 35 U.S.C. 154(b) by 260 days.

(21) Appl. No.: 13/300,312

(22) Filed: Nov. 18, 2011

(65) Prior Publication Data
US 2012/0311233 A1 Dec. 6, 2012

Related U.S. Application Data (60) Provisional application No. 61/492,353, filed on Jun. 1, 2011.

(51) Int. Cl.
G06F 13/10 (2006.01)

(52) U.S. Cl.
USPC .......................................... 711/103

(58) Field of Classification Search
None
See application file for complete search history.

(56) References Cited

U.S. PATENT DOCUMENTS

| | | | |
|---|---|---|---|
| 4,463,375 A | 7/1984 | Macovski | |
| 4,584,686 A | 4/1986 | Fritze | |
| 4,589,084 A | 5/1986 | Fling et al. | |
| 4,866,716 A | 9/1989 | Weng | |
| 5,077,737 A | 12/1991 | Leger et al. | |
| 5,297,153 A | 3/1994 | Baggen et al. | |
| 5,657,332 A | 8/1997 | Auclair et al. | |
| 5,729,490 A | 3/1998 | Calligaro et al. | |
| 5,793,774 A | 8/1998 | Usui et al. | |
| 5,926,409 A | 7/1999 | Engh et al. | |
| 5,956,268 A | 9/1999 | Lee | |
| 5,982,659 A | 11/1999 | Irrinki et al. | |
| 6,038,634 A | 3/2000 | Ji et al. | |
| 6,094,465 A | 7/2000 | Stein et al. | |
| 6,119,245 A | 9/2000 | Hiratsuka | |
| 6,182,261 B1 | 1/2001 | Haller et al. | |
| 6,192,497 B1 | 2/2001 | Yang et al. | |
| 6,195,287 B1 | 2/2001 | Hirano | |
| 6,199,188 B1 | 3/2001 | Shen et al. | |
| 6,209,114 B1 | 3/2001 | Wolf et al. | |
| 6,259,627 B1 | 7/2001 | Wong | |
| 6,278,633 B1 | 8/2001 | Wong et al. | |
| 6,279,133 B1 | 8/2001 | Vafai et al. | |
| 6,301,151 B1 | 10/2001 | Engh et al. | |
| 6,370,061 B1 | 4/2002 | Yachareni et al. | |
| 6,374,383 B1 | 4/2002 | Weng | |
| 6,504,891 B1 | 1/2003 | Chevallier | |

(Continued)

OTHER PUBLICATIONS

Search Report of PCT Patent Application WO 2009/118720 A3.

(Continued)

*Primary Examiner* — Duc Doan
(74) *Attorney, Agent, or Firm* — Dentons US LLP (57) ABSTRACT

A method, computer readable medium storing instructions and system for managing flash memory. Data sector are received and each is written into a data block of a buffer of a non-volatile memory device. Pointers in a data management structure are created for each data sector corresponding to an associated logical block and a storage location of the data sector in the buffer. When a predefined criterion is fulfilled before the buffer becomes full, a number of logical blocks to be merged is determined and data sectors corresponding to the number of logical blocks to be merged are written from the buffer to a primary non-volatile data storage memory of the non-volatile memory device.

39 Claims, 6 Drawing Sheets

(56) References Cited

U.S. PATENT DOCUMENTS

| | | |
|---|---|---|
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,290,203 B2 | 10/2007 | Emma et al. |
| 7,292,365 B2 | 11/2007 | Knox |
| 7,301,928 B2 | 11/2007 | Nakabayashi et al. |
| 7,441,067 B2 | 10/2008 | Gorobets et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,697,326 B2 | 4/2010 | Sommer et al. |
| 7,706,182 B2 | 4/2010 | Shalvi et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,961,797 B1 | 6/2011 | Yang et al. |
| 8,020,073 B2 | 9/2011 | Emma et al. |
| 8,122,328 B2 | 2/2012 | Liu et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2003/0065876 A1 | 4/2003 | Lasser |
| 2003/0101404 A1 | 5/2003 | Zhao et al. |
| 2003/0105620 A1 | 6/2003 | Bowen |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0153722 A1 | 8/2004 | Lee |
| 2004/0153817 A1 | 8/2004 | Norman et al. |
| 2004/0181735 A1 | 9/2004 | Xin |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2006/0059406 A1 | 3/2006 | Micheloni et al. |
| 2006/0059409 A1 | 3/2006 | Lee |
| 2006/0064537 A1 | 3/2006 | Oshima et al. |
| 2006/0101193 A1 | 5/2006 | Murin |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2008/0010581 A1 | 1/2008 | Alrod et al. |
| 2008/0028014 A1 | 1/2008 | Hilt et al. |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0219050 A1 | 9/2008 | Shalvi et al. |
| 2008/0225599 A1 | 9/2008 | Chae |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0043951 A1 | 2/2009 | Shalvi et al. |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn et al. |
| 2009/0144600 A1 | 6/2009 | Perlmutter et al. |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2010/0005270 A1 | 1/2010 | Jiang |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |

(56) References Cited

U.S. PATENT DOCUMENTS

| | | | |
|---|---|---|---|
| 2010/0110787 A1 | 5/2010 | Shalvi et al. | |
| 2010/0115376 A1 | 5/2010 | Shalvi et al. | |
| 2010/0122113 A1 | 5/2010 | Weingarten et al. | |
| 2010/0124088 A1 | 5/2010 | Shalvi et al. | |
| 2010/0131580 A1 | 5/2010 | Kanter et al. | |
| 2010/0131806 A1 | 5/2010 | Weingarten et al. | |
| 2010/0131809 A1 | 5/2010 | Katz | |
| 2010/0131826 A1 | 5/2010 | Shalvi et al. | |
| 2010/0131827 A1 | 5/2010 | Sokolov et al. | |
| 2010/0131831 A1 | 5/2010 | Weingarten et al. | |
| 2010/0146191 A1 | 6/2010 | Katz | |
| 2010/0146192 A1 | 6/2010 | Weingarten et al. | |
| 2010/0149881 A1 | 6/2010 | Lee et al. | |
| 2010/0174853 A1* | 7/2010 | Lee et al. | 711/103 |
| 2010/0180073 A1 | 7/2010 | Weingarten et al. | |
| 2010/0199149 A1 | 8/2010 | Weingarten et al. | |
| 2010/0211724 A1 | 8/2010 | Weingarten | |
| 2010/0211833 A1 | 8/2010 | Weingarten | |
| 2010/0211856 A1 | 8/2010 | Weingarten | |
| 2010/0251066 A1 | 9/2010 | Radke | |
| 2010/0253555 A1 | 10/2010 | Weingarten et al. | |
| 2010/0257309 A1 | 10/2010 | Barsky et al. | |
| 2010/0293321 A1 | 11/2010 | Weingarten | |
| 2011/0051521 A1 | 3/2011 | Levy et al. | |
| 2011/0055461 A1 | 3/2011 | Steiner et al. | |
| 2011/0096612 A1 | 4/2011 | Steiner et al. | |
| 2011/0119562 A1 | 5/2011 | Steiner et al. | |
| 2011/0153919 A1 | 6/2011 | Sabbag | |
| 2011/0161775 A1 | 6/2011 | Weingarten | |
| 2011/0214029 A1 | 9/2011 | Steiner et al. | |
| 2011/0214039 A1 | 9/2011 | Steiner et al. | |
| 2011/0246792 A1 | 10/2011 | Weingarten | |
| 2011/0246852 A1 | 10/2011 | Sabbag | |
| 2011/0252187 A1 | 10/2011 | Segal et al. | |
| 2011/0252188 A1 | 10/2011 | Weingarten | |
| 2011/0271043 A1 | 11/2011 | Segal et al. | |
| 2011/0302428 A1 | 12/2011 | Weingarten | |
| 2012/0001778 A1 | 1/2012 | Steiner et al. | |
| 2012/0005554 A1 | 1/2012 | Steiner et al. | |
| 2012/0005558 A1 | 1/2012 | Steiner et al. | |
| 2012/0005560 A1 | 1/2012 | Steiner et al. | |
| 2012/0008401 A1 | 1/2012 | Katz et al. | |
| 2012/0008414 A1 | 1/2012 | Katz et al. | |
| 2012/0051144 A1 | 3/2012 | Weingarten et al. | |
| 2012/0063227 A1 | 3/2012 | Weingarten et al. | |
| 2012/0066441 A1 | 3/2012 | Weingarten | |
| 2012/0110250 A1 | 5/2012 | Sabbag et al. | |

OTHER PUBLICATIONS

Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.

Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, p. II-369-72 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips. com), 2005.
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1, 2003.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com, 2005.
JEDEC Standard, "Stress-Test-Driven Qualification of Integrated Circuits", JEDEC Solid State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

* cited by examiner

SYSTEM AND METHOD FOR MANAGING A NON-VOLATILE MEMORY

CROSS-REFERENCE TO RELATED APPLICATIONS

This application is a NONPROVISIONAL of, claims priority to and incorporates by reference U.S. provisional patent application No. 61/492,353, filed Jun. 1, 2011.

FIELD OF THE INVENTION

The embodiments of the invention relate generally to the field of memory storage. More particularly, the disclosed embodiments relate to a system and method of managing flash memory.

BACKGROUND

Flash memory devices store information with high density on Flash cells with ever smaller dimensions. In addition, Multi-Level Cells (MLC) store several bits per cell by setting the amount of charge in a cell. Flash memory devices are organized into (physical) pages. Each page includes a section allocated for data (512 bytes-8 Kbytes and expected larger in the future) and a small amount of spare bytes (64-512 or more bytes for every page) for storing redundancy and metadata. The redundancy bytes are used to store error correcting information, for correcting errors which may have occurred during flash lifetime and the page Read process. Each Program operation is performed on an entire page. A number of pages are grouped together to form an Erase Block (erase block). A page cannot be erased unless the entire erase block which contains it is erased.

One common application of flash memory devices is Secure Digital (SD) cards. An SD card may typically contain flash memory devices and a flash memory controller. The controller translates commands arriving through the SD interface into actions (Read/Write/Erase) on the flash memory devices. The most common SD commands may be Read and Write commands of one or more sectors, where a sector may be, but is not limited to, a sequence of 512 bytes. The Read or Write commands may be directed to a single sector or multiple sectors. These commands may refer to logical addresses. These addresses may then be redirected to new addresses on the flash memory which need not directly correspond to the logical addresses that might be referenced by the Read or Write commands. This is due to memory management that may be carried out by the flash memory controller in order to support several features such as wear-leveling, bad block management, firmware code and data, error-correction, and others. The erase function is performed on an entire erase block. Because of this functionality, before the data of a certain block may be replaced such as during a write function, the new data must be written in an alternative location before an erase can occur, to preserve the integrity of the stored data.

Due to the small dimensions of a typical SD card and the price limitations, the controller may typically have only a small RAM available for storage. The small size of the RAM memory limits the type of memory management which may be carried out by the controller with regard to the data stored in the flash memory device and received from the interface.

The controller may typically manage the memory at the erase block level, because managing data of small particle sizes becomes difficult. That is, the logical memory space may be divided into units of memory contained within a single erase block or some constant. multiple of erase blocks, such that all logical sector addresses within each said unit of memory may be mapped to the same erase block or some constant multiple thereof.

This type of management has the drawback that for writing random access data sectors to memory or other memory units smaller than an erase block, erase blocks must be frequently rewritten. Because of the characteristics of flash memory, each new piece of information is written into an empty page. In flash memory a page may not be rewritten before the entire erase block is erased first.

If a portion of the memory unit contained within an erase block may need to be rewritten, it is first written into a freshly allocated erased erase block. The remaining, unmodified, contents of the erase block may then be copied into the new erase block and the former erase-block may be declared as free and may be further erased. This operation may be referred to as "sealing" or "merging". The operation involves collecting the most recent data of a logical block and then merging it with the rest of the block data in a single erase block. Thus, even if a single sector from an erase block is rewritten, a complete erase block would be rewritten.

This may result in causing a significant degradation in the average write speed. It may also impose a significant delay in the response time between random write sector operations. It also may cause excessive P/E (program/erase) cycling, which may be problematic in new generations of flash memory devices where the number of P/E cycles is limited to a few thousand.

The controller is used to manage the overhead described above, and must always keep track of the data associated with each logical address and the actual memory location. This is usually achieved by implementing a mapping method between the logical address space assigned to the data and the actual memory storage location of the data.

Several methods may be implemented to execute such a mapping. Two approaches implement mapping systems that rely on block mapping and page mapping, respectively. In an approach using block mapping, each physical block in the flash memory is mapped to a contiguous logical memory block of the same data size (LBA). In this approach when one page in some logical block is updated, the entire associated physical block must be copied to a fresh block, and the new data must be written in place of the obsolete copy. A merge may be an operation where the original content of a logical block is merged with the new data to form a new up to date copy of the block. This up to date copy is the data block that is associated with a logical data block assigned to the data contained within. In the second approach, each logical page of a logical block is mapped to an arbitrary physical page where two pages belonging to the same logical block can reside in different physical blocks of the flash memory. The second approach requires additional complexity in terms of the amount of management data and memory overhead required for the physical memory to logical address mapping tables. For memory applications where severe limitations exist on available control memory, this approach is less appropriate. Flash memories such as SD have limited amount of memory overhead and the first mapping approach, or variants thereof are more practical.

SUMMARY OF THE INVENTION

Embodiments of the invention may provide a device and method for reducing peak to average ratio of write throughput in non-volatile based storage systems. Non-volatile technologies can include flash or any other non-volatile technology that mandates erasing in erase blocks.

A method may include receiving data sectors from an interface; writing each data sector into a data block of a buffer such as an extended random sector buffer (ERSB) of the flash memory; creating pointers in a data management structure, for each data sector corresponding to an associated logical block and a storage location of the data sector in the non-volatile extended random sequence buffer; and upon a fulfillment of a predetermined criterion (which is fulfilled before the buffer is full) then determining a number of logical blocks to be merged; and writing the data sectors corresponding to said number of logical blocks from the extended random sequence buffer to the primary non-volatile data storage memory. The predefined criteria can be fulfilled, for example, if during the writing of the data sectors a data block in the extended random sequence buffer in the non-volatile memory becomes full.

According to some embodiments of the invention, the method may further comprise determining an instantaneous number of logical blocks which have at least one associated page in extended random sequence buffer, wherein determining said number of logical blocks comprises of determining said number of logical blocks based on said instantaneous number of logical blocks.

According to an embodiment of the invention, the method may include determining the number of logical blocks to be merged in response to a difference between (i) the instantaneous number of logical blocks which have at least one associated data page in the buffer and (ii) a product of a multiplication of the number of transaction timeout durations required to complete a single merge operation by a ratio between the number of data blocks in the buffer and the number of memory pages in a data block of the buffer.

According to some embodiments of the invention, writing the data sectors corresponding to said number of logical blocks from the extended random sequence buffer to the primary non-volatile data storage memory may comprise, selecting a set of logical blocks corresponding to said determined number of logical blocks based on a predetermined algorithm; and writing the data sectors corresponding to the selected logical blocks from the extended random sequence buffer to the primary non-volatile data storage memory.

According to some embodiments of the invention, selecting said number of logical blocks based on a predetermined algorithm may comprise, determining a set of indices based on an ordering permutation which is defined for a plurality of indices corresponding to a number of logical blocks associated with the flash memory unit; and selecting a set of logical blocks corresponding to said determined number of logical blocks based on the determined set of indices.

According to some embodiments of the invention, writing the data sectors from the buffer to primary non-volatile data storage memory may comprise, merging the data sectors into erase block sections of data; writing the plurality of erase block sections of data to a plurality of erase blocks in the primary non-volatile data storage memory; and creating for each data sector a pointer in a data management structure, corresponding to an associated logical block and a storage location of the erase blocks in the primary non-volatile data storage memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, the present invention may be practiced without these specific details. In other instances, well-known methods, procedures, and components have not been described in detail so as not to obscure the present invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In this specification various references are made to flash memory elements. It is noted that the suggested methods, systems and computer readable mediums are applicable to non-volatile technologies that mandate erasing by erase blocks and may not be limited to flash.

In this specification various references are made to one or more predefined criterions that once fulfilled may trigger stages such as determining a number of logical blocks to be merged and writing data sectors. It is noted that for simplicity of explanation alone there is provided an example of such a predefined criterion where a data block of the extended random sequence buffer becomes full. It is noted that other predefined criterions can be enforced. Some predefined criteria are listed in various parts of the specification and claims. Any reference to the fullness of the data block should be interpreted as being applied to any other predefined criterion.

Embodiments of the invention may provide for a method and system for managing flash memory to reduce peak to average ratio of write throughput in flash based storage systems. Embodiments of the invention may interact with an interface and may receive an input of a plurality of data sectors. The data sectors may then be stored in an extended random sequence buffer contained in non-volatile memory. For each data sector received from the interface a pointer may be created corresponding to an associated logical block and a storage location of the data sector in the non-volatile extended random sequence buffer. The pointer may be written to a data management structure. Once one of a plurality of data blocks in the extended random sequence buffer in the non-volatile memory may become full, then a number of logical blocks may be merged. The data sectors associated with the said number of logical blocks may be written from the extended random sequence buffer to the primary non-volatile data storage memory.

According to some embodiments of the invention the merge operation may be initiated when any fixed portion of a data block may become full or the like.

Some embodiments of the invention may provide for a flash memory controller that may be contained within the flash memory unit. A flash memory unit may include any or all of a volatile memory module, a non-volatile memory module, an interface module and may include additional modules. In other embodiments of the invention the flash memory controller may be contained in a control unit, separate from the flash memory unit. In one embodiment of the invention the flash memory controller may be contained on a logical device, such as a computer.

In some embodiments of the invention, the interaction with an interface may be an interaction with an interface of a logic device, such as a computer. Such logical device may be capable of sending and receiving sectors of data and may further be capable of sending and receiving data that contains information including commands corresponding to actions performed on the data by the flash memory controller and address information for the data sectors assigned by the logic device. Logic may refer to hardware, software, other logic, or any suitable combination of the preceding. Certain logic may manage the operation of a device, and may comprise, for example, a processor.

An interface may refer to logic of a device operable to receive input for the device, send output from the device, perform suitable processing of the input or output or both, or any combination of the preceding, and may comprise one or more ports, conversion software, or both A data sector may refer to a packet of data which may be limited to a single data size, may vary in sizes or both in different embodiments of the invention. A data sector is a packet of data that may be smaller in size than the size of a single erase block of the corresponding flash memory unit.

In some embodiments of the invention, the input of a stream of data sectors may occur in response to an action or command executed by the flash controller. In one embodiment of the invention, the input consisting of a stream of data sectors may occur when the data sectors are present on the interface.

In some embodiments of the invention the extended random sequence buffer contained in the volatile memory may be an allocated portion of the flash memory containing the primary non-volatile data storage of the flash memory unit. In one embodiment of the invention the extended random sequence buffer may be contained in a memory module in the non-volatile memory separate from the flash memory module containing the primary non-volatile data storage of the flash memory unit. According to one embodiment of the invention the extended random sequence buffer may be a collection of auxiliary data blocks which may hold short write transactions until a later stage when the data of these transactions may be merged.

Embodiments of the invention may refer to a pointer as a logic data type whose value refers directly or otherwise, using its address, to another value or segment of data stored elsewhere in a memory of a logic device. Such logic devices include, but are not limited to a flash memory unit. In some embodiment of the invention it may be cheaper in time and space to copy and dereference pointers than it is to copy and access the data to which the pointers point.

In some embodiments of the invention, a pointer may be used in data structures to implement and control the data structures. In embodiments of the invention the data structures include one or more of lists, queues and trees. In one embodiment of the invention the pointers may be absolute such that the actual physical or virtual address is used in the pointer. In another embodiment of the invention the pointers may be relative, such that the pointer addresses represent a set offset from an absolute start or nominal address. In embodiments of the invention, pointers are not limited to a specific data size or format.

Embodiments of the invention may provide for a data management structure arrangement that may include a data management structure stored in the volatile memory portion of the flash memory unit and may also include a data management structure stored in a non-volatile memory module of the flash memory unit.

In embodiments of the invention the data management structure may be implemented in one or more forms of storing data. These may include an array, a link list, a hash table, a heap, a tree, a stack or a queue. In some embodiments of the invention, the data management structure may store information including data, metadata, pointers or other data types which can be implemented to store address and location information.

According to some embodiments of the invention a method may be provided. The method may include (i) receiving a plurality of data sectors, wherein each received data sector may be associated with an erase block out of a plurality of erase blocks; (ii) writing the data sectors into data blocks of the extended random sequence buffer in the non-volatile memory; (iii) creating pointers in a data management structure, for each data sector corresponding to an associated logical block and a storage location of the data sector in the non-volatile extended random sequence buffer; (iv) if during said writing of the data sectors a data block in the extended random sequence buffer in the non-volatile memory becomes full, then determining a set of logical blocks to be merged and writing the data sectors corresponding to said set of logical blocks from the extended random sequence buffer to the primary non-volatile data storage memory According to one embodiment of the invention, the plurality of data sectors may be received or become available at the interface from a logical device. Such logical device may be a computer. The erase block may refer to a set size portion of memory corresponding to the smallest block of data that may be erased by the flash controller or as a response to an erase request by the flash controller, without affecting the data contained in any other portion of the memory. In one embodiment of the invention the plurality of erase blocks may refer to some or all of the erase blocks which may be stored in the primary non-volatile data storage, the extended random sequence buffer or both.

According to some embodiments of the invention, the extended random sequence buffer in the non-volatile memory may contain a plurality of data blocks among other elements. According to one embodiment of the invention, data blocks of the extended random sequence buffer may have the same data storage size as the erase blocks of the primary non-volatile data storage memory. According to some embodiments of the invention, the data blocks of the extended random sequence buffer may contain a plurality of data pages. According to one embodiment of the invention the data blocks and data pages of the sequence memory may have the same write, read and erase properties as the erase blocks and pages of the primary non-volatile data storage memory.

According to some embodiments of the invention writing incoming data sectors to the data blocks in the extended random sequence buffer may be accomplished by writing one or a set plurality of incoming data sectors to one of the plurality of data blocks, wherein the data block to be written to may be selected from a plurality of data blocks using various available processes. According to one embodiment of the invention the data block to be written may be determined by utilizing a random function to choose a data block from a plurality of data blocks which may be all or some of the data blocks contained in the extended random sequence buffer. According to another embodiment the data block to be written may be determined by executing a hashing function which produces a hash value which may be associated with one of a plurality of data blocks of the extended random sequence buffer.

According to embodiments of the invention a pointer or a plurality of pointers may be created in a data management structure for each data sector write or erase operation, which may include write and erase operations performed on the extended random sequence buffer and/or the primary non-volatile data storage memory. According to some embodiments of the invention a single pointer or a plurality of pointers may contain information associated with the corresponding logical block of the data sector and the address location of the data sector. The address location of the data sector may refer to a data block or page in the extended random sequence buffer and/or the primary non-volatile data storage memory. According to one embodiment of the invention one or more additional pointers may be required for each data sector, Pointers may be implemented to point to or between the pointers associated with the logical block and data address, as well as point to data management structures and the like.

According to some embodiments of the invention a logical block may refer to a variable or other parameter which may be associated with a plurality of data sectors, wherein the data sectors may be stored in the primary non-volatile data storage memory, in the extended random sequence buffer or not yet received at the interface by the flash memory unit. According to one embodiment of the invention a logical block parameter may be assigned to data sectors by the logical device during or before the data sectors are received by the flash memory controller. According to another embodiment of the invention data sectors may be assigned one of a plurality of logical blocks by the flash controller when the data sectors are received at the interface or at another time.

According to some embodiments of the invention the total plurality of logical blocks may correspond to the number of available data blocks in the primary non-volatile data storage memory. According to one embodiment of the invention the maximum number of data sectors which may be associated with any one logical block may be such that the total data size of the data sectors assigned to a logical block does not exceed the size of a single erase block of the flash memory unit.

According to embodiments of the invention, data sectors may be merged. Merging may refer to a process that may include collecting the most recent data sectors or pages associated with a logical block in the extended random sequence buffer, which may be appended with other data associated with the logical block contained in the primary non-volatile data storage memory. The merged data may then be written to an available erase block and the former erase block may be declared as free and may be further erased. The total size of the data merged block may be equal or less than the size of a single erase block.

Merging may refer to a process that may include collecting the most recent data of a logical block, which may be merged with other data contained in a single erase block. The block of data may then be written to a new erase block and the former erase block may be declared as free and may be further erased.

According to some embodiments of the invention a merge operation may be initiated once every time a fixed portion of a data block may become full. For example every half of a data block.

According to some embodiment of the invention, each new sector to be written to the flash memory unit may be assessed regarding its write target. The write target may refer to a choice of one of a plurality of memory modules contained in the non-volatile memory of the flash memory unit. The memory modules may include, but are not restricted to, a random access memory module and a sequential access memory module.

According to embodiments of the invention when block mapping is used without additional algorithms or utilizing an extended random sequence buffer to map data sectors in the flash memory unit the amount of merge operations may become more than desired by the flash memory design. For example, when a sequence of writes is performed to the memory system such that each write belongs to a different data block, each write operation may require an independent merge operation. A single merge operation may take an amount of time which may be of the order of the timeout permitted to complete the write operation which may include the merge operation in its allotted time. This may cause the system to fail to perform all requested write operations in time.

According to an embodiment of the invention the use of the extended random sequence buffer may be able to overcome the excess time required by write operations. For example, when the flash memory unit receives a random sequence of write operations, wherein each write operation may consist of writing a data sector of 4 KB and where the address of each write operation may be randomly chosen from the primary non-volatile data storage memory, all data transaction may be performed initially to the extended random sequence buffer. This may allow the throughput of data for these write operations to be relatively high and may be primarily determined by the write speed that may be supported by the flash memory unit. When the extended random sequence buffer may become close to full, it may be necessary to vacate some of the data blocks of the information written in them.

Each data block of the extended random sequence buffer may contain pages which have been written with incoming data sectors associated with a large portion or all of the plurality of logical block corresponding to the data blocks in the primary non-volatile data storage memory. In such a scenario, to vacate a single data block the flash memory controller may be required to merge a very large number of data sectors associated with the logical blocks involved. Each merge operation may require a substantial amount of time, which may decrease the possible throughput of the flash memory device for the duration of the merge operations. The duration of the merge operation may continue until at least one or a defined number of data blocks in the extended random sequence buffer are freed. A data block being freed may refer to a condition including when the data block does not contain information which has not been written to the primary non-volatile data storage memory, when the data block is actually free of written data and when a variable associated with the data block has been set to represent that the data block is available for writing data sectors. When at least one block may be freed the high rate of throughput may be restored.

Figure 1:
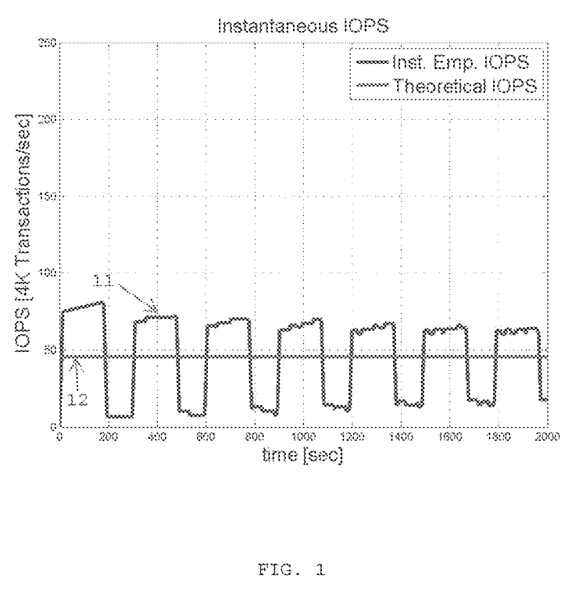
FIG. 1 is a schematic diagram of instantaneous data throughput in IOPS versus a range of time in accordance with an embodiment of the invention.

FIG. 1 is a schematic diagram of instantaneous data throughput in Input/Output Operations Per Second (IOPS) versus a range of time in accordance with an embodiment of the invention.

FIG. 1 illustrates a data block mapping system implementing an extended random sequence buffer according to an embodiment of the invention which implements no further algorithms with the block mapping process.

Curve 11 of FIG. 1 illustrates that without further algorithms in addition to the block mapping process, a non-stable throughput behavior may result when random writes are performed to the flash memory system. FIG. 1 compares instantaneous IOPS (curve 11) with a theoretical IOPS over a time range (curve 12).

The instantaneous throughput in FIG. 1 represents a measurement in IOPS. IOPS may refer to a measurement of the number of 4 KB write transactions per second. The theoretical IOPS may represent an average theoretically computed for the IOPS illustrated IOPS measurement. FIG. 1 shows that due to the nature of the flash memory unit and the block mapping process the theoretical average throughput of data to the flash memory is a steady mean over the long term, but can drop much lower than the long term average for a substantially long period of time.

According to embodiments of the invention, IOPS may be calculated by:

$$IOPS = N_{ERSB}*N_{pgs}-f*N_{LB}/(N_{ERSB}*N_{pgs}-f*N_{LB})*SI_T + N_{LB}*M_T$$

According to some embodiments of the invention, $N_{ERSB}$ may refer to the number of data blocks in the extended random sequence buffer, $N_{pgs}$ may refer to the number of pages in one data block in the extended random sequence buffer, f may refer to the number of transaction timeout durations required to complete a merge operation A transaction timeout may refer to a period of time which may be required by the flash memory unit specification as the maximum period of time permitted to complete a single write operation. If a write transaction may have not completed by this time, the memory system is not compliant with the specification. The extended random sequence buffer was designed to cope with this limitation, which if not handled appropriately, may lead to violations of the timeout in cases where random access data sectors are written.

The peaky behavior illustrated in curve 11 may result from the following policy: A writing operation of such data sectors that may reside in different logical blocks may each require a full data block merge. A merge operation may take a period of time longer than one timeout duration (e.g., f such timeouts). Therefore, a random access sector write may be problematic. The extended random sequence buffer may solve this issue by writing all such sectors to a special buffer (which represents the peaks in curve 11), and may use the remaining time of the transaction timeout for performing merges (this remaining time is represented in the lower values of the IOPS—between said peaks).

According to some embodiments of the invention, when the extended random sequence buffer may become close to full, more sectors may be stored into the extended random sequence buffer as they arrive to the interface and also a merge process may be initiated. When a writing operation of a data sector to the extended random sequence buffer may be complete, in the remaining time until the timeout, a merge operation may be performed.

Referring to FIG. 1—the sharp transitions from low IOPS values and to high IOPS values (peaks) occur each 300 seconds. The transitions between high IOPS values to low IOPS values occur at the same cycle but at a delay of about 200 seconds.

According to an embodiment of the invention, after f data sectors are written to the extended random sequence buffer, a single merge operation may be complete. This method may permit the merge operations to be performed within the spare time allotted for write operations without violating the transaction timeout specification.

According to one embodiment of the invention, each merge operation may free more than one data sector in the extended random sequence buffer. This may permit freeing data sectors with less than one merge operation for each data sector.

$N_{LB}N_{LB}$ may refer to the number of logical blocks associated to the data blocks of the primary non-volatile data storage memory, $SI_T$ may refer to the time duration for writing a single page to a data block in the primary non-volatile data storage memory and/or the extended random sequence buffer, and $M_T$ may refer the time duration for performing one merge operation.

According to some embodiments of the invention if the flash memory data capacity of the unit is high, for example 128 GB, and no further algorithms are implemented with the block mapping process and the extended random sequence buffer, the time duration during which the throughput of the flash memory unit may be low may be for example over an hour.

According to embodiments of the invention a method may be implemented for managing the memory system in a way which may circumvent severe fluctuations in the IOPS performance. The method may also be capable of an average performance range which may be the same or similar to the throughput range of the standard flash memory unit utilizing the extended random sequence buffer to implement a block mapping process. According to one embodiment of the invention, a method may be implemented which may be capable of performing at an equivalent long term average IOPS throughput rate as a flash memory unit which implements no further algorithms with the block mapping process and the extended random sequence buffer, but with nearly no fluctuations with respect to the average IOPS throughput.

According to some embodiments of the invention the impulsive behavior of the write IOPS may be mitigated by performing periodic merges. Periodic merges may be performed before the extended random sequence buffer becomes almost full. The extended random sequence buffer being full may refer to a condition when data blocks in the extended random sequence buffer are not able to accept additional data sector writes.

According to one embodiment of the invention periodic merges of the data in the extended random sequence buffer may be initiated at periodic time intervals or number of data writes.

According to another embodiment of the invention merges of the data may be initiated every time one of the data blocks of the extended random sequence buffer may become fully written. A data block becoming fully written may refer to a condition when there are no pages in the data block which are able to accept a data sector write without being erased.

According to some embodiments of the invention every time one of a plurality of data block of the extended random sequence buffer may become full a defined number of logical blocks may be merged. According to one embodiment of the invention the data sectors associated with a logical block are written to a single data block in the primary non-volatile data storage memory.

According to some embodiments of the invention the number of logical blocks to be merged out of the total logical blocks which are associated with data sectors stored in the extended random sequence buffer may be determined according to an algorithm which may determine a number based on one or more inputs and one or more predefined factors.

According to some embodiments of the invention the number of logical blocks to be merged may be determine by Number of blocks to merge=g(A(t)*Nelb(t))

Function g(*) may refer to some integer valued function. According to some embodiments of the invention, A(t)*Nelb(t)) need not be an integer. It may be desired for simplicity of implementation that merges of an integer number of logical blocks are performed. According to embodiment of the invention, it may be necessary to transform the number A(t)*Nelb(t)) to an integer.

According to one embodiment of the invention a ceil(x) function may be implemented to determine a corresponding integer value of A(t)*Nelb(t)). A ceil(x) function may refer to a function which may output the smallest integer not smaller than the input x. According to another embodiment of the invention may implement two functions, namely, floor(x), which may return the largest integer not larger than x, and (x−floor(x)). The outcome of floor(x) may be used to determine the number of merge operations to perform. The outcome of (x−floor(x)) may be stored in an accumulator. If the total value of the accumulator exceeds unity, then an extra merge operation may be performed. The accumulator may be then updated which may be accomplished by subtracting 1 from the current accumulator value. Nelb(t)) may refer to the instantaneous number of logical blocks which may have at least one page in the extended random sequence buffer at a time t, and A(t) may refer to a predefined time variable function which may be based on one or more inputs in addition to time.

According to one embodiment of the invention A(t) may be determined by:

$$A(t)=1/\{Nersb-(f*Nelb(t)/Npgs)\}.$$

According to some embodiments of the invention, Nersb may refer to the number of data blocks in the extended random sequence buffer, Npgs may refer to the number of pages in one data block in the extended random sequence buffer, and f may refer to the number of transaction timeout durations required to complete a merge operation.

According to some embodiments of the invention the particular logical blocks which may be merged when at least one data block becomes full may be selected through various processes, including random functions, hash function and algorithms which may require one or more inputs.

According to some embodiments of the invention the particular logical blocks may be chosen by a round robin procedure or variant thereof. A round robin procedure may refer to a method which may be implemented for choosing a resource from a list of a plurality of available resources and which may result in load balancing among the plurality of available resources. According to one embodiment of the invention a simple round robin procedure may include a scheduler selecting one resource out of a plurality of resources which may be pointed to by a counter or the like from a list of available resources. The counter or the like may then be incremented and if the end of the list or predefined condition occurs the counter may be set to a predefined position in the list which may include the beginning of the list. A round robin procedure may result in reducing overuse of resources and prevent resource starvation.

According to one embodiment of the invention, an ordering permutation π(•) is defined over all the block indices in the memory system. The index of a data block which may be associated with the kth merge may be determined by the formula pi(k molulo Nlb). For example, if a flash memory unit contains 4096 logical blocks, a permutation array of size 4096 may be defined, where each entry may hold an index to a logical block and where each logical block index may appear once in the array. A variable array index may then be defined which may be initialized to 0. Each time a data block is to be merged, a logical block is determined corresponding to the logical block index pointed to by the array at the location array index. The array index may then be incremented by 1 modulus 4096. If a logical block whose index may have been determined by the logical block index does not have any pages in the extended random sequence buffer, a subsequent logical block may be determined by the above process. This process may be repeated until a logical block is found which is mapped to at least on data page in the extended random sequence buffer. The selected logical block may be then used in a merge operation.

According to embodiments of the invention the benefit of implementing an additional algorithm which may initiate a merge of the data associated with a determined plurality of logical blocks may be to prevent a situation where the extended random sequence buffer becomes almost full and may need to devote a substantial amount of time to merging data sectors to the primary non-volatile data storage memory when throughput of the flash memory unit is greatly reduced. This method may be referred to as ERSB shaping or just shaping algorithm. According to some embodiments of the invention each time a data block in the extended random sequence buffer may become full some of the logical blocks which may have associated pages in the extended random sequence buffer are merged. The number of logical blocks to be merged in such a condition may be set so that by the time one block in the extended random sequence buffer may become full another data block in the extended random sequence buffer may be declared vacated. Vacated may refer to a condition where the data block may accept directly or after a further erase operation a maximum number of data sector writes for the data block size and data sector writing method.

Figure 2:
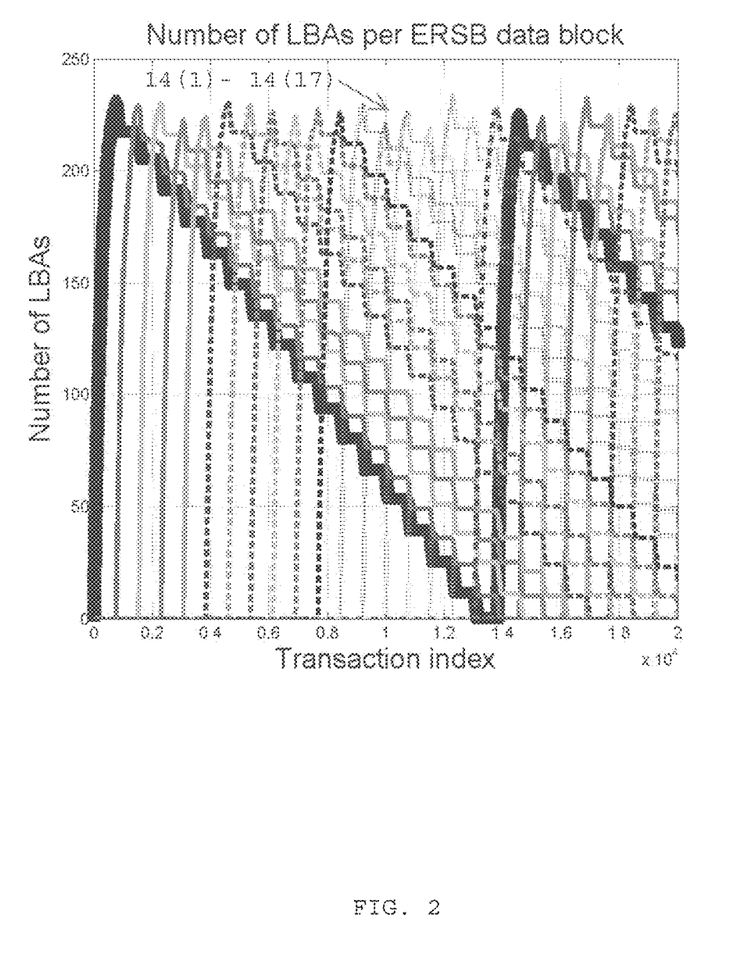
FIG. 2 is a schematic diagram of number of logical blocks versus a range of transactions in accordance with an embodiment of the invention.

FIG. 2 is a schematic diagram of number of logical blocks versus a range of transactions in accordance with an embodiment of the invention.

It is assumed that the buffer includes twenty different data blocks and seventeen curves 14(1)-14(17) represent the fullness level of these seventeen data blocks. These curves illustrate a gradual decrement in the number of logical blocks that have data sectors in each of the data blocks of the buffer due to gradual merging operations. It is assumed that different data blocks are filled at different times and that the fullness level of one block resembles that of another block but with a time shift.

FIG. 2 may depict an example number of logical blocks with pages mapped to each data block in the extended random sequence buffer. FIG. 2 illustrates twenty extended random sequence buffer blocks and two hundred and thirty six logical blocks. The number of extended random sequence buffer data blocks and the number of associated logical blocks illustrated in FIG. 2 are solely provided as an example and in no way limit the number of extended random sequence buffer or the number of logical blocks in the embodiments of the invention. FIG. 2 illustrates that each block may become occupied with pages, with data sectors written to them, from all or most of the logical blocks. It is shown that once a data block becomes fully written or full, another extended random sequence buffer data block may be used as the destination for data sector write transactions and may become more populated with each transaction. When an extended random sequence buffer data block becomes full all other blocks which have stored data sectors can be seen to decrease the amount of stored pages as a merge is performed.

FIG. 2 shows that when the last extended random sequence buffer data block is about to become filled with data sectors, another data block in the extended random sequence buffer may become empty. This may allow writing transactions to continue without stopping to perform merges of the data sectors.

According to embodiments of the invention at each instant of the writing transaction processes there may be an occupancy distribution of the logical blocks among all the extended random sequence buffer data blocks such that some blocks may have more logical blocks associated with them while some data blocks may have less.

According to embodiments of the invention, a uniform distribution of merge operation may be achieved and the throughput of the instantaneous write throughput may be maintained at a relatively constant rate compared to a system implementing block mapping process and utilizing extended random sequence buffer without further algorithms.

Figure 3:
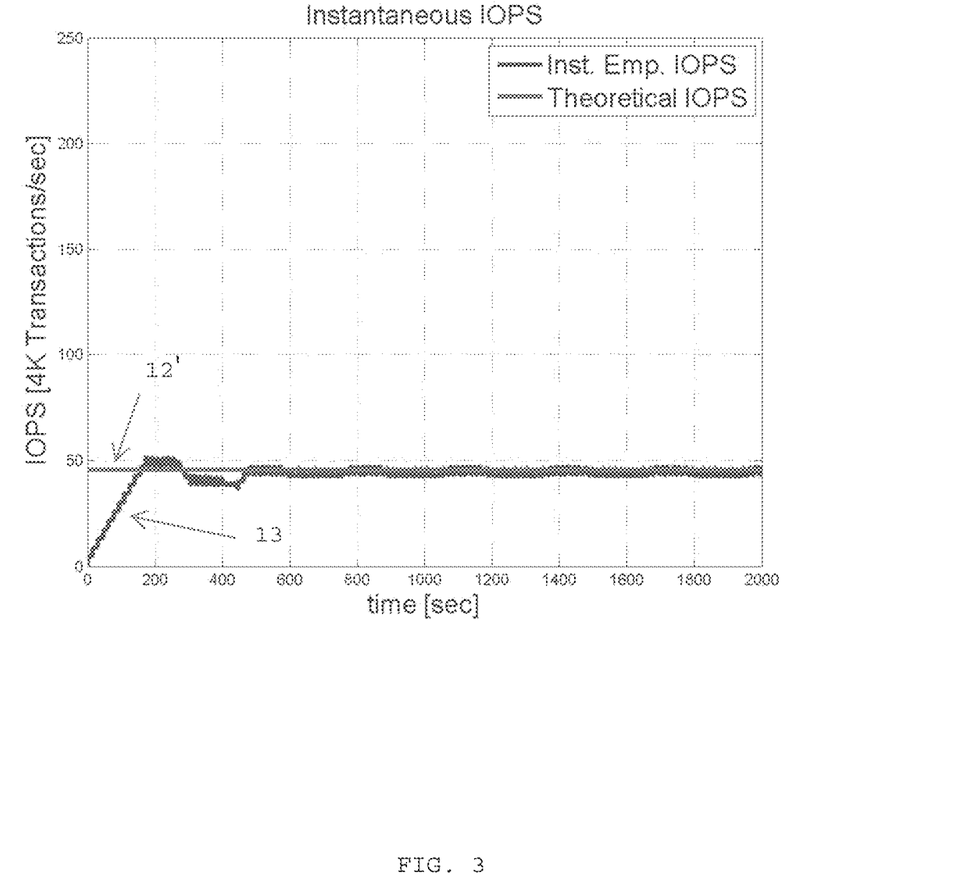
FIG. 3 is a schematic diagram of instantaneous data throughput in IOPS versus a range of time in accordance with an embodiment of the invention.

FIG. 3 is a schematic diagram of instantaneous data throughput in IOPS versus a range of time in accordance with an embodiment of the invention. FIG. 3 illustrates the effect of implementing the shaping algorithm together with the block mapping process utilizing the extended random sequence buffer. Curve 13 of FIG. 3 shows that the throughput of embodiments of the invention implementing the shaping algorithm experience much less variation in instantaneous throughput rates over time as may be compared to FIG. 1. Curve 13 is much closer to the theoretical IOPS curve 12' than curve 11 of FIG. 1 is close to curve 12 of FIG. 1

Figure 4:
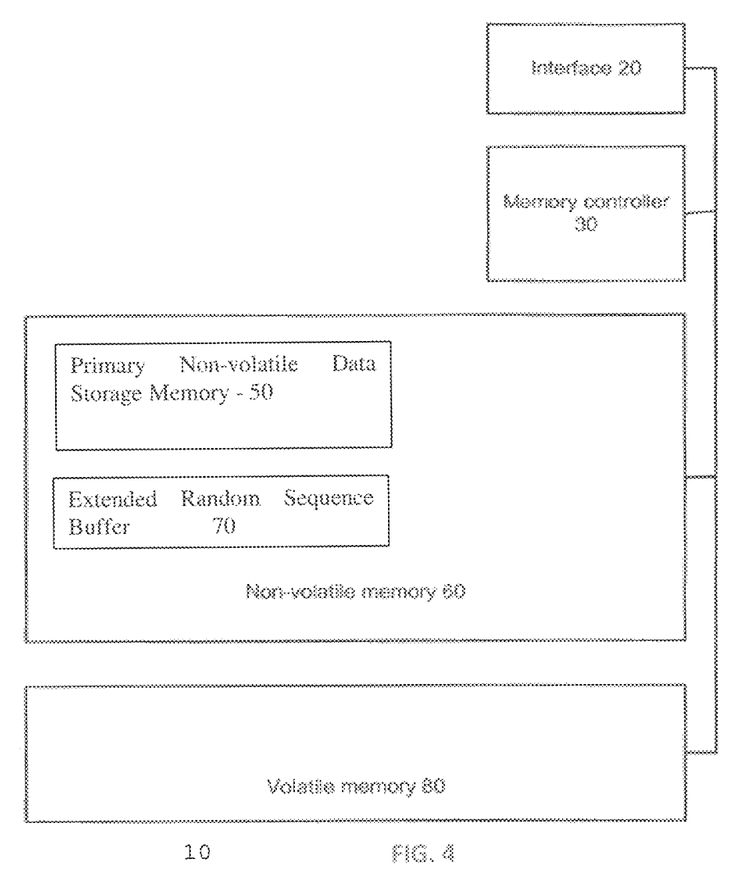
FIG. 4 schematically illustrates a system according to an embodiment of the invention.

FIG. 4 schematically illustrates a system 10 according to embodiments of the invention. The system includes an interface (20) that may be linked to a memory controller (30) and may be also linked to a non-volatile memory module (60) and a volatile memory module (80).

The non-volatile memory module (60) may contain a primary non-volatile data storage memory (50) and an extended random sequence buffer (70). Some data structures such as the extended random sequence buffer (70) may be illustrated as being contained outside the primary non-volatile data storage memory (50), although these structures may be a single module which may be partitioned logical or by another non-physical partition.

The extended random sequence buffer (70) may store incoming data sectors received from the interface (20) in a plurality of data blocks. The memory controller may write to the extended random sequence buffer (70) the incoming data sectors from the interface (20).

One or more data management structures which may store pointers associated with written data sectors may be stored in one or more of the extended random sequence buffer (70), the primary non-volatile data storage memory (50) and the volatile memory (80).

Data sectors that may be associated with the same logical block may be written in the extended random sequence buffer (70) until being merged. The merged blocks may be written to the primary non-volatile data storage memory (50).

Figure 5:
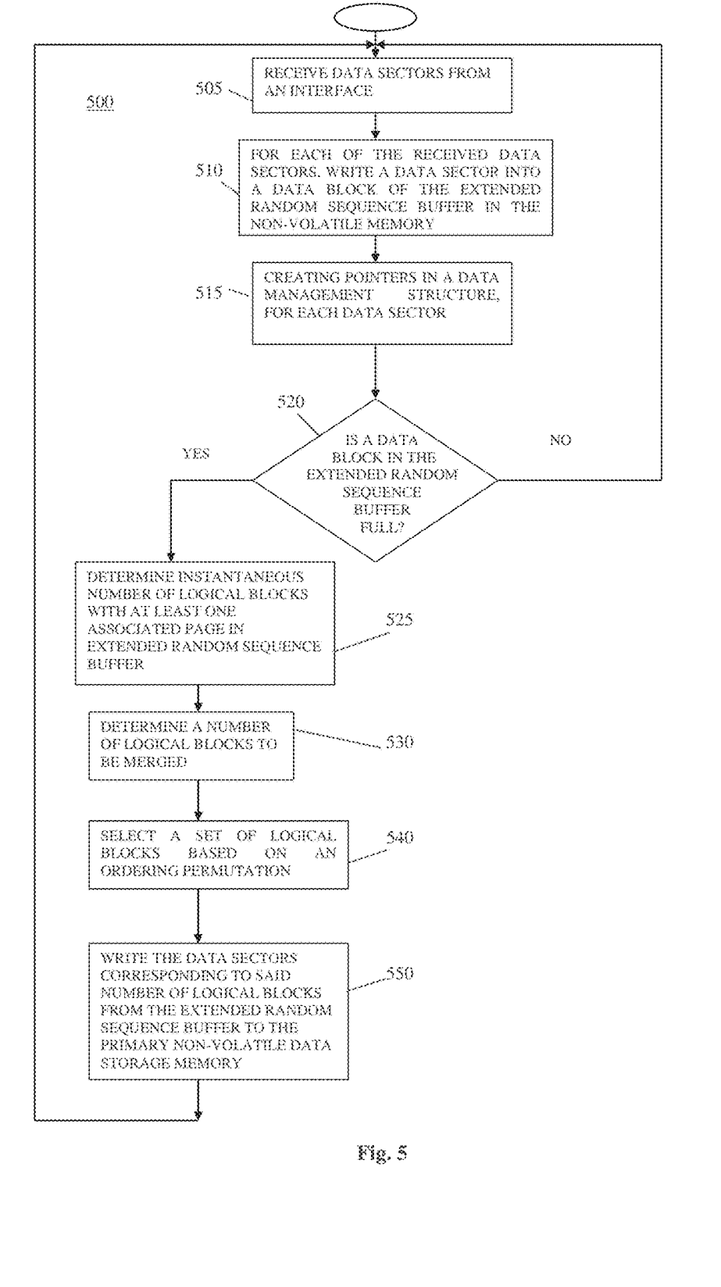
FIG. 5 is a schematic flow chart diagram of a method according to an embodiment of the invention.

FIG. 5 is a schematic flow chart diagram of a method 500 in accordance with an embodiment of the invention. A flash memory controller may receive data sectors from an interface (505). Each data sector may then be written into an extended random sequence buffer in the non-volatile memory (510). In some embodiments of the invention the write action (510) may be automatic in response to data sectors being received at the interface (505). In one embodiment of the invention the method may wait until a preset plurality of data sectors are received at the interface (505) or some further action triggers the write action (510). According to some embodiments of the invention, the extended random sequence buffer (510) may reference a memory section which may be a part of the non-volatile memory module of the flash memory unit. In one embodiment of the invention, the extended random sequence buffer may be located in the same module as the primary non-volatile data storage memory.

For each data sector that may be written into the buffer (510) the method may create a pointer in a data management structure (515). In some embodiments of the invention, the data management structure may be contained in one or both of a volatile memory and a non-volatile memory of the flash memory unit.

If one or more of a plurality of data blocks contained in the extended random sequence buffer may become full (520) the method may perform an additional process, otherwise the method will continue to perform steps 505, 510 and 515.

If one or more of a plurality of data blocks contained in the extended random sequence buffer may become full the method may determine the instantaneous number of logical blocks with at least one associated page in a data block contained in the extended random sequence buffer (525). According to one embodiment of the invention determining the instantaneous number of logical blocks with at least one associated page in a data block contained in the extended random sequence buffer may be accomplished by requesting or reading a measurement of the state of the data blocks contained in the extended random sequence buffer. According to another embodiment of the invention the instantaneous number of logical blocks with at least one associated page in a data block contained in the extended random sequence buffer may be determined as a result of a function which may look at historical measurements of the state of the data blocks or other measurements associated with one or more previous states of the data blocks in the extended random sequence buffer. According to one embodiment of the invention, a binary array may be used to hold for every logical block in the system an indication to whether or not there is at least one page of this block located in the extended random sequence buffer. Such an array may be modified, if necessary, after each page write operation and after each merge operation.

The method may then determine a set of logical blocks to be merged based on the instantaneous number of logical blocks with at least one associate page in a data block contained in the extended random sequence buffer (530). According to one embodiment of the invention the set of blocks to be merged may be directly proportional to the instantaneous number of logical blocks with at least one associated page in a data block contained in the extended random sequence buffer. According to another embodiment of the invention, the number of blocks to be merged may be a result of an algorithm that may take into account one or more inputs, measurements and the like, including the instantaneous number of logical blocks with at least one associated page in a data block contained in the extended random sequence buffer.

An ordering permutation may be executed to select from a plurality of logical blocks which may be associated with data sectors stored in pages in the extended random sequence buffer a set of logical block determined in 530 (540). According to embodiments of the invention various ordering permutations may be used, including permutations which may be modified by one or more inputs as the method proceeds.

The method may then write the data sectors corresponding to said number of logical blocks from the extended random sequence buffer to the primary non-volatile data storage memory (550).

According to embodiments of the invention 550 may be done by merging data sectors associated with a logical block stored in the extended random sequence buffer with data sectors associated with the logical block stored in the primary non-volatile data storage memory. The merged data sectors may then be written to an available data block in the primary non-volatile data storage memory. According to one embodiment of the invention the primary non-volatile data storage memory data block may then or after a further erase process be declared as available.

Extensions of the above shaping algorithm are also possible within the scope of the invention. For example, when the device is first used, the ERSB may typically be empty. In some embodiments of the invention, the above smoothing algorithm may not be used until the ERSB is full for the first time. This initially permits very high IOPs at first at the expense of lower ones later on. After the first time the ERSB has been filled, the above smoothing algorithm may be applied for subsequent transactions.

As some applications allow background operation (e.g., embedded multimedia card, or eMMC), some merge operation may be initiated even when there are no transactions at all, and thus, over time, emptying the ERSB. Thus, a sort burst of random transactions may appear to have very high IOPs, and during rest time, merge operations may be performed to empty the ERSB. On the other hand, if a long sequence of random transactions takes place, the above smoothing algorithm may be used, and a stable and sustained IOPs performance will be observed.

Finally, in some embodiments of the invention, during the initial phase the algorithm may not be applied until the device is filled to a fraction of its capacity, e.g., half, two-thirds, three-quarters, four-fifths, etc. At that stage, the above smoothing algorithm may be applied with an adapted value for alpha, such that the IOPs drops will not be as severe as before, thereby shaping the IOPs performance over time.

According to an embodiment of the invention a computer readable medium can be provided that is non-transitory. The computer readable medium can store instructions that once executed by a computer may result in the implementation of any of the mentioned above methods.

Figure 6:
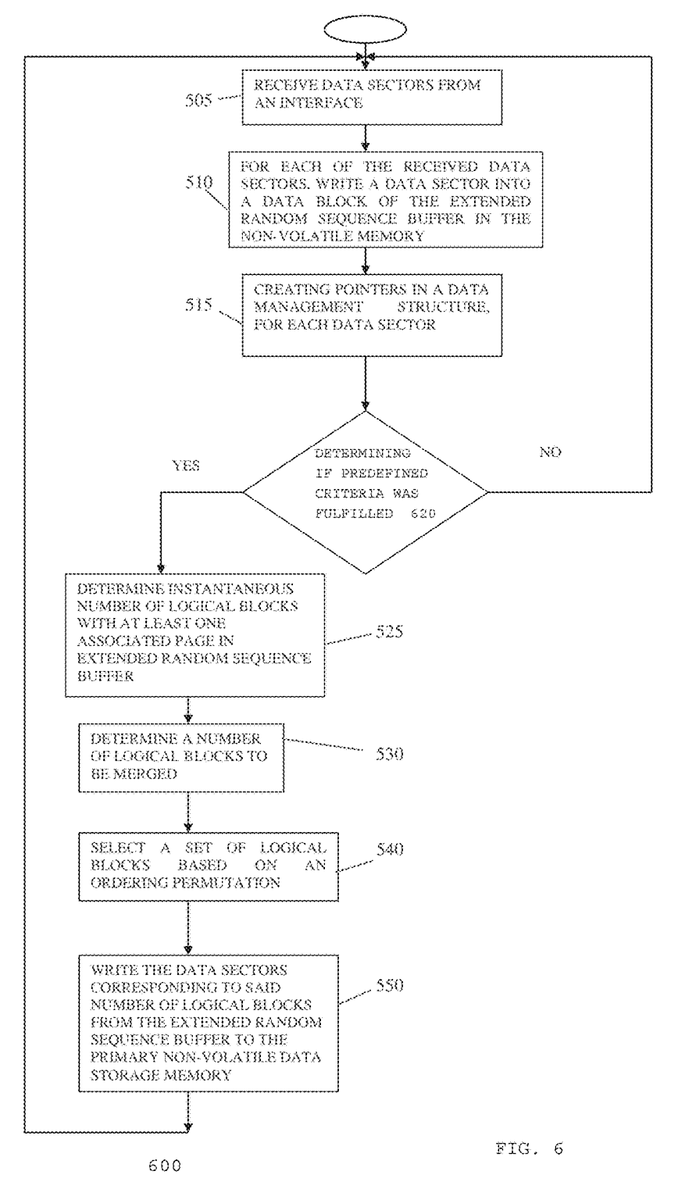
FIG. 6 is a schematic flow chart diagram of a method according to an embodiment of the invention.

FIG. 6 is a schematic flow chart diagram of a method 600 in accordance with an embodiment of the invention.

Method 600 differs from method 500 by including stage 620 instead of stage 520. While stage 520 of method 500 is illustrated as including checking whether a data block in the extended random sequence buffer if full, stage 620 includes checking if a predefined condition is fulfilled. The predetermined condition is fulfilled before the buffer is full.

Stage 620 may include performing stage 520 but it may also include one or more other predefined criteria, some of which illustrated in the specification. Non-limiting examples of such a predefined criterion may include: (i) at least two data blocks out of multiple data blocks of the buffer become full; (ii) a predefined fraction of the buffer becomes full, wherein the predefined fraction does not exceed a half of the buffer; (iii) the predefined criterion may change during a lifespan of the non-volatile memory device; (iv) a first portion of the buffer is full for a first time or when a second portion of the buffer is full after the first portion was full for the first time; wherein a size of the first portion differs from a size of the second portion, the first portion may be bigger than the second portion; (v) at least one data block of the buffer becomes empty and at least one data block of the buffer becomes full.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of managing a non-volatile memory device, the method comprising:
receiving data sectors;
writing each data sector into a data block of a buffer of the non-volatile memory device;
creating pointers in a data management structure, for each data sector, wherein each pointer corresponds to a logical block associated with the data sector and to a storage location of the data sector in the buffer;
detecting that a predefined criterion is fulfilled; wherein the predefined criterion is fulfilled before the buffer becomes full;
determining a number of logical blocks to be merged; and
writing, in response to the detecting and to the determining, data sectors corresponding to the number of logical blocks to be merged, from the buffer to a primary non-volatile data storage memory of the non-volatile memory device;
wherein the non-volatile memory device mandates erasing erase blocks of data.

2. The method according to claim 1, wherein the predefined criterion is fulfilled when a data block out of multiple data blocks of the buffer becomes full.

3. The method according to claim 1, wherein the predefined criterion is fulfilled when a predefined fraction of the buffer becomes full, wherein the predefined fraction of the buffer does not exceed a half of the buffer.

4. The method according to claim 1, wherein the predefined criterion changes during a lifespan of the non-volatile memory device.

5. The method according to claim 1, comprising:
determining that the predefined criterion is fulfilled when a first portion of the buffer is full for a first time; and
determining that the predefined criterion is fulfilled when a second portion of the buffer is full after the first portion was full for the first time; wherein a size of the first portion differs from a size of the second portion.

6. The method according to claim 1, comprising selecting data sectors to be merged in response to the number of logical blocks to be merged and numbers of data sectors within the buffer that are associated with each logical block.

7. The method according to claim 1, comprising determining the number of logical blocks to be merged in response to (a) an instantaneous number of logical blocks which have at least one associated data sector in the buffer; (b) a number of data blocks in the buffer; (c) a number of memory pages in each data block of the buffer, and (d) a number of transaction timeout durations required to complete a single merge operation.

8. The method according to claim 1, comprising determining the predefined criterion so that once at least one data block of the buffer becomes full, at least one other data block of the buffer is empty.

9. The method according to claim 1, further comprising determining an instantaneous number of logical blocks which have at least one associated data sector in the buffer, wherein determining of said number of logical blocks to be merged is responsive to the instantaneous number of logical blocks.

10. The method according to claim 1, comprising: selecting a selected set of logical blocks corresponding to said number of logical blocks to be merged based on a predetermined algorithm; and writing the data sectors corresponding to the selected set of logical blocks from the buffer to the primary non-volatile data storage memory.

11. The method according to claim 10, wherein the selecting of the selected set of logical blocks based on the predetermined algorithm comprises: determining a set of indices based on an ordering permutation which is defined for a plurality of indices corresponding to a number of logical blocks associated with the non-volatile memory device; and selecting the selected set of logical blocks based on the set of indices.

12. The method according to claim 1, wherein the writing of the data sectors from the buffer to the primary non-volatile data storage memory comprises:
merging the data sectors into a plurality of erase block sections of data;
writing the plurality of erase block sections of data to a plurality of erase blocks in the primary non-volatile data storage memory; and
creating for each data sector that was merged a pointer in the data management structure, the pointer corresponding to a logical block associated with the data sector and to a storage location of the erase block sections of data that comprises the data sector in the primary non-volatile data storage memory.

13. The method according to claim 12, comprises merging data sectors associated with a logical block with data sectors stored in the primary non-volatile data storage memory associated with the logical block.

14. A non-transitory computer readable medium that stores instructions for:
receiving data sectors; writing each data sector into a data block of a buffer of the non-volatile memory device;
creating pointers in a data management structure, for each data sector, wherein each pointer corresponds to a logical block associated with the data sector and to a storage location of the data sector in the buffer;
detecting that a predefined criterion is fulfilled; wherein the predefined criterion is fulfilled before the buffer becomes full;
determining a number of logical blocks to be merged; and
writing, in response to the detecting and to the determining, data sectors corresponding to the number of logical blocks to be merged, from the buffer to a primary non-volatile data storage memory of the non-volatile memory device;
wherein the non-volatile memory device mandates erasing erase blocks of data.

15. The non-transitory computer readable medium according to claim 14, wherein the predefined criterion is fulfilled when a data block out of multiple data blocks of the buffer becomes full.

16. The non-transitory computer readable medium according to claim 14, wherein the predefined criterion is fulfilled when a predefined fraction of the buffer becomes full, wherein the predefined fraction of the buffer does not exceed a half of the buffer.

17. The non-transitory computer readable medium according to claim 14, wherein the predefined criterion changes during a lifespan of the non-volatile memory device.

18. The non-transitory computer readable medium according to claim 14, storing instructions for determining that the predefined criterion is fulfilled when a first portion of the buffer is full for a first time; and determining that the predefined criterion is fulfilled when a second portion of the buffer is full after the first portion was full for the first time; wherein a size of the first portion differs from a size of the second portion.

19. The non-transitory computer readable medium according to claim 14, storing instructions for selecting data sectors to be merged in response to the number of logical blocks to be merged and numbers of data sectors within the buffer that are associated with each logical block.

20. The non-transitory computer readable medium according to claim 14, storing instructions for determining the number of logical blocks to be merged in response to (a) an instantaneous number of logical blocks which have at least one associated data sector in the buffer; (b) a number of data blocks in the buffer; (c) a number of memory pages in each data block of the buffer, and (d) a number of transaction timeout durations required to complete a single merge operation.

21. The non-transitory computer readable medium according to claim 14 storing instructions for determining the predefined criterion so that once at least one data block of the buffer becomes full, at least one other data block of the buffer is empty.

22. The non-transitory computer readable medium according to claim 14, storing instructions for determining an instantaneous number of logical blocks which have at least one data sector in the buffer, wherein determining of said number of logical blocks to be merged is responsive to the instantaneous number of logical blocks.

23. The non-transitory computer readable medium according to claim 14, storing instructions for selecting a selected set of logical blocks corresponding to said number of logical blocks to be merged based on a predetermined algorithm; and writing the data sectors corresponding to the selected set of logical blocks from the buffer to the primary non-volatile data storage memory.

24. The non-transitory computer readable medium according to claim 23, storing instructions for determining a set of indices based on an ordering permutation which is defined for a plurality of indices corresponding to a number of logical blocks associated with the non-volatile memory device; and selecting the set of the logical blocks based on the determined set of indices.

25. The non-transitory computer readable medium according to claim 14, storing instructions for:
merging the data sectors into a plurality of erase block sections of data;
writing the plurality of erase block sections of data to a plurality of erase blocks in the primary non-volatile data storage memory; and
creating for each data sector that was merged a pointer in the data management structure, the pointer corresponding to a logical block associated with the data sector and to a storage location of the erase block sections of data that comprises the data sector in the primary non-volatile data storage memory.

26. The non-transitory computer readable medium according to claim 14, storing instructions for merging data sectors stored in the buffer and associated with a logical block with data sectors stored in the primary non-volatile data storage memory associated with the logical block.

27. A system for managing a non-volatile memory device, the system comprises:
an interface arranged to receive data sectors;
a memory controller that is arranged to:
write each data sector into a data block of a buffer of the non-volatile memory device;
create pointers in a data management structure, for each data sector, wherein each pointer corresponds to a logical block associated with the data sector and to a storage location of the data sector in the buffer;
detect that a predefined criterion is fulfilled; wherein the predefined criterion is fulfilled before the buffer becomes full;
determine a number of logical blocks to be merged; and
write, in response to the detecting and to the determining, data sectors corresponding to the number of logical blocks to be merged, from the buffer to a primary non-volatile data storage memory of the non-volatile memory device;
wherein the non-volatile memory device mandates erasing erase blocks of data.

28. The system according to claim 27, wherein the predefined criterion is fulfilled when a data block out of multiple data blocks of the buffer becomes full.

29. The system according to claim 27, wherein the predefined criterion is fulfilled when a predefined fraction of the buffer becomes full, wherein the predefined fraction of the buffer does not exceed a half of the buffer.

30. The system according to claim 27, wherein the predefined criterion changes during a lifespan of the non-volatile memory device.

31. The system according to claim 27, wherein the memory controller is arranged to determine that the predefined criterion is fulfilled when a first portion of the buffer is full for a first time; and determine that the predefined criterion is fulfilled when a second portion of the buffer is full after the first portion was full for the first time; wherein a size of the first portion differs from a size of the second portion.

32. The system according to claim 27, wherein the memory controller is arranged to select data sectors to be merged in response to the number of logical blocks to be merged and numbers of data sectors within the buffer that are associated with each logical block.

33. The system according to claim 27, wherein the memory controller is arranged to determine the number of logical blocks to be merged in response to (a) an instantaneous number of logical blocks which have at least one associated data sector in the buffer; (b) a number of data blocks in the buffer; (c) a number of memory pages in each data block of the buffer, and (d) a number of transaction timeout durations required to complete a single merge operation.

34. The system according to claim 33, wherein the memory controller is arranged to determine the predefined criterion so that once at least one data block of the buffer becomes full at least one other data block of the buffer is empty.

35. The system according to claim 27, wherein the memory controller is arranged to determine an instantaneous number of logical blocks which have at least one associated data sector in the buffer, wherein the memory controller is arranged to determine said number of logical blocks to be merged in response to the instantaneous number of logical blocks.

36. The system according to claim 27, wherein the memory controller is arranged to select a selected set of logical blocks corresponding to said number of logical blocks to be merged based on a predetermined algorithm; and write the data sectors corresponding to the selected set of logical blocks from the buffer to the primary non-volatile data storage memory.

37. The system according to claim 36, wherein memory controller is arranged to select the selected set of the logical blocks based on the predetermined algorithm by determining a set of indices based on an ordering permutation which is defined for a plurality of indices corresponding to a number of logical blocks associated with the non-volatile memory device; and selecting the set of the logical blocks based on the set of indices.

38. The system according to claim 27, wherein the memory controller is arranged to:
merge the data sectors into a plurality of erase block sections of data;
write the plurality of erase block sections of data to a plurality of erase blocks in the primary non-volatile data storage memory; and
create for each data sector that was merged a pointer in the data management structure, the pointer corresponding to a logical block associated with the data sector and to a storage location of the erase block sections of data that comprises the data sector in the primary non-volatile data storage memory.

39. The system according to claim 38, wherein the memory controller is arranged to merge data sectors stored in the buffer associated with a logical block with data sectors stored in the primary non-volatile data storage memory associated with the logical block.

* * * * *